United States Patent [19]
Kahr et al.

[11] Patent Number: 5,701,323
[45] Date of Patent: Dec. 23, 1997

[54] DYE LASERS AND ORGANIC INCLUSIONS FOR SAME

[75] Inventors: Bart Kahr, Lafayette; Sei-Hum Jang; Daniel S. Elliott, both of West Lafayette, all of Ind.

[73] Assignee: Purdue Research Foundation, West Lafayette, Ind.

[21] Appl. No.: 661,978

[22] Filed: Jun. 12, 1996

[51] Int. Cl.$^6$ ............................................. H01S 3/20
[52] U.S. Cl. ...................................... 372/54; 372/53
[58] Field of Search ............................ 372/54, 53

[56] References Cited

U.S. PATENT DOCUMENTS

| | | | |
|---|---|---|---|
| 4,016,133 | 4/1977 | Hyosu et al. | 260/42.21 |
| 4,826,283 | 5/1989 | Chuangtian et al. | 350/96.12 |
| 4,878,224 | 10/1989 | Kuder et al. | 372/53 |
| 5,053,641 | 10/1991 | Cheng et al. | 359/330 |
| 5,124,999 | 6/1992 | Okazaki et al. | 372/69 |
| 5,134,622 | 7/1992 | Deacon | 372/21 |
| 5,136,005 | 8/1992 | Hermes | 526/292.3 |
| 5,169,986 | 12/1992 | Tsunekawa et al. | 564/273 |
| 5,173,799 | 12/1992 | Tanuma | 359/326 |
| 5,195,104 | 3/1993 | Geiger et al. | 372/97 |
| 5,222,088 | 6/1993 | Amano | 372/22 |
| 5,260,953 | 11/1993 | Rowe | 372/20 |
| 5,268,913 | 12/1993 | Sakowski et al. | 372/22 |
| 5,287,381 | 2/1994 | Hyuga et al. | 372/75 |
| 5,329,540 | 7/1994 | Lee et al. | 372/53 |
| 5,348,688 | 9/1994 | Sharp et al. | 252/582 |

OTHER PUBLICATIONS

Caligaris, Carmel, "Solid-State Dyes Show Commerical Potential", *Laser Focus World*, pp. 28, 30 (Oct., 1994).

Caligaris, Carmel, "Solid-State Dye Lasers: New and Highly Promising", *Photonics Spectra*, pp. 87-88 (Jan., 1995).

Padgett, M.J., and Dunn, M.H., "Dye-Laser Alternatives Cover The Spectrum", *Laser Focus World*, pp. 69-76 (Sep., 1994).

Higgins, Thomas V., "Solid-State Laser Materials Search Demands Luck, Art, And Science", *Laser Focus World*, pp. 133-144 (Apr., 1993).

Solarz, Richard W. and Krupke, William F., "Diode Pumped Lasers Finding Commercial Applications", *R&D Magazine*, pp. 89-92 (May, 1992).

Vasilash, Gary S., "Almost Everything You Can Know About Diode-Pumped Nd:YAG Lasers", *Production* (May, 1994).

Stambler, Irwin, "Blue Laser System Breaks Data Storage Recorda", *R&D Magazine*, p. 53 (Sep., 1993).

Marshall, Larry, "Will Solid-State Lasers Get The Green Light?", *Laser Focus World*, pp. 87-96 (Feb., 1995).

Kelley, Michael P., Janssens, Bart and Kahr, Bart, "Recognition Of Dyes By $K_2SO_4$ Crystals: Choosing Organic Guests For Simple Salts", *J. Am. Chem. Soc.*, vol. 116, No. 12, pp. 5519-5520 (1994).

*Primary Examiner*—Leon Scott, Jr.
*Attorney, Agent, or Firm*—Woodard, Emhardt, Naughton Moriarty & McNett

[57] ABSTRACT

Disclosed are solid state lasers and laser gain media which include lasing crystals having crystalline lattice incorporating lasable organic dye molecules in regular positions. The monolithic crystals are readily prepared and the organic dye can be varied across a broad range of available materials to vary the emission characteristics of the crystals.

25 Claims, 2 Drawing Sheets

5,701,323

DYE LASERS AND ORGANIC INCLUSIONS FOR SAME

BACKGROUND OF THE INVENTION

The present invention relates generally to dye lasers and more particularly to dye lasers employing crystals having included therein at regular positions effective amounts of laser dye material.

As further background, over the years dye lasers have found wide use in differing fields of science, technology and industry. These include spectroscopy, optics and more recently fields related to medicine including photodynamic therapy, for example in the elimination of cardiovascular lesions in surgery. These dye lasers are capable of producing stimulated emission across a broad spectral range, including visible, ultraviolet and infrared emission. This wide range of emission combined with tunability at low cost have made dye lasers particularly attractive.

Early on, dye lasers for the most part were solution-based, that is, the laser dye was provided in aqueous solution, and this solution pumped with other lasers such as Q-switched ruby or glass lasers, or sometimes with flash lamps. In the traditional solution dye laser design, the solution was provided flowing through an optical cavity for the laser-pumping operation. This served to prevent overheating of the laser dye solution which causes breakdown of the organic dye molecules and a concomitant shortening of the lifetime of the laser. While operative, this arrangement was highly inconvenient since the handling of varying dye solutions was necessary when changing the emitted spectral range of the laser. In light of these difficulties, the art has been aggressively searching for alternative means for handling the laser dyes.

A major area of investigation in this regard has been solid state dye lasers. That is, the dyes are incorporated in a solid which is pumped to provide emission in the desired spectral range. Several solid matrices have been proposed for carrying laser dye, including primarily polymers and glassy or silicious materials such as sol gels.

In the polymeric area, since the early reports such as those by (1) and (2), much study has been directed to polymeric hosts for laser dyes. Many polymeric materials have been proposed, including poly(styrene), poly(methylmethacrylate), and modified versions thereof (see, e.g. (3) and (4), and references cited therein. However, polymeric materials carry with them a primary disadvantage of low heat stability. Thus, in use, dye-doped disks of polymeric materials are used, and these disks are rotated such that only a small area of the disc is pumped at any given time and only for a short interval, whereafter the heat generated in the area can be dissipated prior to exposure again to the pumping source. Nonetheless, the poor heat stability of organic matrices has limited the useful lifetime of these polymeric hosts.

The area of silicious hosts has also generated much interest. For example, inorganic oxide glass materials with micropore structures have been used as reported in (5). In (5), the microporous glass is soaked in a solution containing a laser dye, which impregnates the glass and migrates to pores via capillary action. However, the porosity of such material can provide poor mechanical properties and optical finish to the host.

Another approach has been to incorporate the laser dye in a sol gel, as reported in (6). However, the preparation of the doped host sol gels is somewhat complicated and time consuming.

In light of this background and the continued growth and demand for reliable lasers for applications in science, industry and medicine, there remains a strong need for stable solid hosts for laser dyes and laser systems incorporating the same. The present invention addresses these needs.

SUMMARY OF THE INVENTION

Accordingly, the present invention provides in one preferred embodiment a solid-state dye laser which includes a lasing crystal which has a crystalline lattice incorporating lasable organic dye molecules oriented in a single crystal register in the crystal lattice, and a pumping energy source operably coupled with the crystal and operable to produce stimulated emission of the crystal. The crystalline lattice provides a suitable host for the lasable dye molecules and can for example be grown from inorganic salts such as alkali metal sulfates or phosphates. In the present invention the organic lasable dye molecules are included at regular positions in the crystals as they are grown, thus providing an overall lasing crystal highly effective in solid state dye laser applications.

Another preferred embodiment of the invention provides a method of lasing which comprises providing a lasing crystal having a crystalline lattice incorporating a lasable organic dye molecules oriented in single crystal register in the lattice. This method comprises the further step of pumping the lasing crystal with a pumping energy source to produce stimulated emission of the lasing crystal.

A still further preferred embodiment of the invention provides a crystal useful for non-linear optics, which includes a monolithic crystal having a crystalline lattice, and, incorporated in the crystalline lattice a single crystal register, a fluorescent dye which is a trisulfonated pyrene derivative.

The present invention provides solid state dye lasers, methods and novel crystal materials which are highly conveniently prepared and are expected to be highly heat stable. Moreover, lasing crystals suitable for the invention can be prepared having laser dyes providing emission across a broad spectral range, thus leading to highly convenient selection and tuning of the spectral characteristics of the emitted energy. Still further, the crystals of and for the invention can be prepared from readily available and highly inexpensive materials. Still further objects, features, advantages and embodiments to the invention will be apparent upon reviewing the following description and dependent claims.

DESCRIPTION OF THE PREFERRED EMBODIMENT

Figure 1:
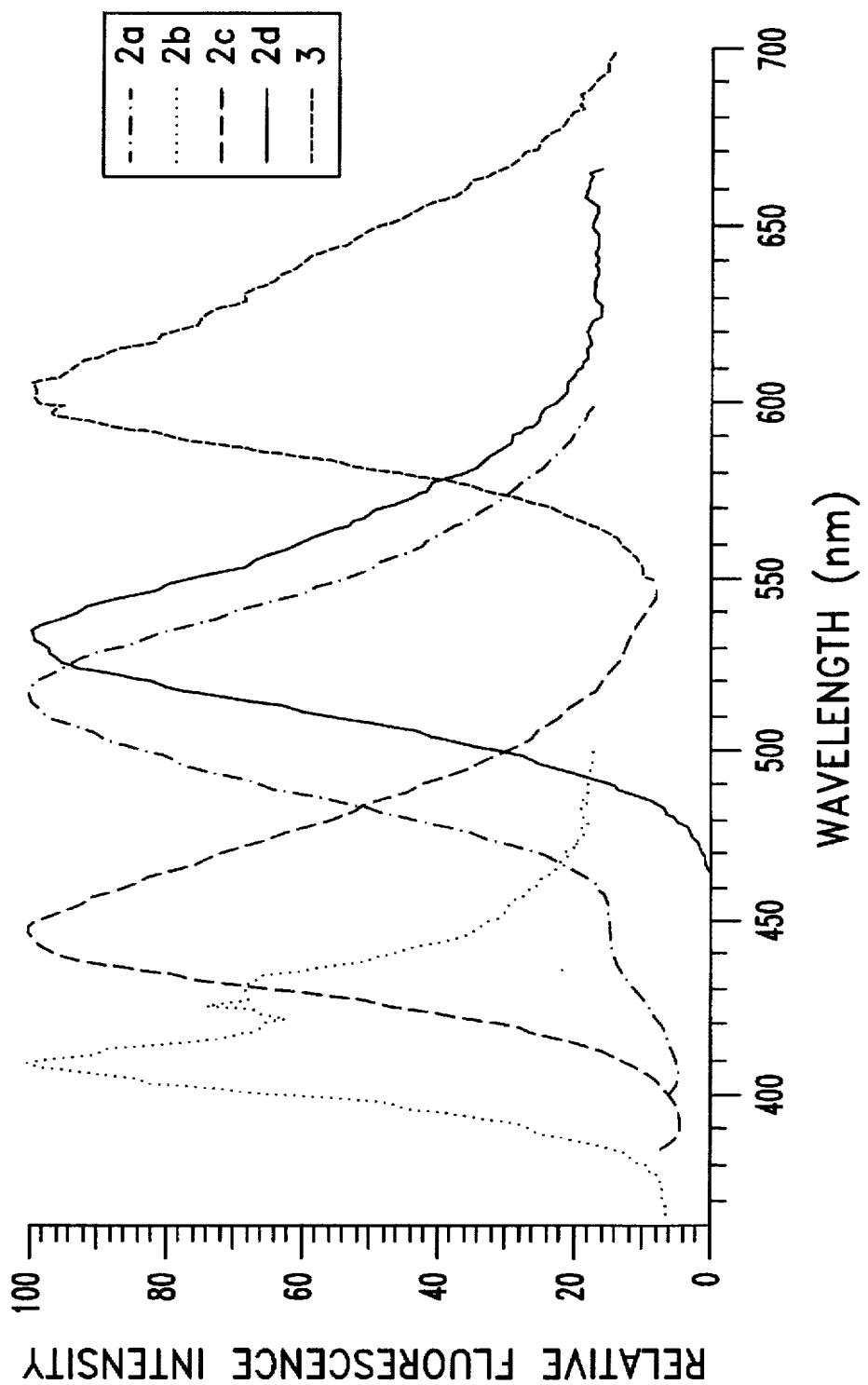
FIG. 1 provides fluorescent spectra for various lasable dyes included in potassium sulfate crystals of the present invention.

For the purposes of promoting an understanding of the principles of the invention, reference will now be made to certain embodiments thereof and specific language will be used to describe the same. It will nevertheless be understood that no limitation of the scope of the invention is thereby intended, such alterations, further modifications and applications of the principles of the invention as illustrated herein being contemplated as would normally occur to one skilled in the art to which the invention relates.

As indicated above, the present invention provides solid state dye lasers and lasing methods, and novel crystalline structures useful in non-linear optical applications including in such lasers and lasing methods.

More specifically discussing the various aspects of the invention, suitable crystalline lattices useful as hosts in the invention can be made from a range of salts. Generally speaking, salts are selected that can be obtained of large, well-faceted single crystals from aqueous solutions. In addition, the salts will be chosen to form host crystals having optical transparency and high stability as to photochemical and thermal effects. In this regard, this optical transparency will include transparency to both incident and exit light frequencies which are to be employed. Preferred inorganic salt materials for these purposes include alkali metal salts such as potassium and rubidium salts, with potassium salts being particularly preferred to date. The particular counterion employed is not critical to the broad aspects of the present invention, and can for example be a selenate, nitrate, phosphate or sulfate anion. Sulfate and phosphate counter ions are preferred in work to date. Suitable salts for use in the present invention thus include potassium sulfate, rubidium sulfate, potassium dihydrogen phosphate, and isomorph salts thereof. Potassium salts such as potassium sulfate and potassium dihydrogen phosphate are conveniently used and are preferred. For example, in the case of lasers using potassium dihydrogen phosphate crystals, the use of a frequency doubling device can be avoided and diode pumping can be employed, thus providing for the construction of simple, effective self frequency-doubled lasing systems.

A very broad range of lasable dyes are known and will be suitable for use in the present invention. For example, such dyes include the many known lasing organic compounds, which have been generally classified in accordance with their chemical structures. Commonly classified dyes include cyanine, xanthene, triarylmethane, acridine, azine, chlorophyll, polyphenylene, condensed aromatic rings, coumarin, oxazole, phthalimide, pteridine, and similar chemical classes. A compilation of over five hundred lasable dyes is provided in (7), to which reference can be made for further information on the subject. Among these, sulfonated laser dyes, particularly those including triarylmethane structures, or condensed aromatic ring structures such as pyrene are preferred, especially for use in connection with potassium sulfate crystals. On the other hand, orthohydroxy azo dyes, for example Chicago sky blue, Acid Red 27 and Acid Red 114, or dyes which otherwise contain hydrogen bond donors or anionic substituents, for example phosphate laser dyes, will be preferred for use with potassium dihydrogen phosphate crystals. In addition, bifunctional laser dyes may be used to increase the affinity of the fluorophores for the salt, for instance potassium dihydrogen phosphate, and thereby increase concentrations of the fluorophore in the crystals. Generally speaking, these laser dyes used in the invention will provide emission in the spectral range spanning from about 200 to about 1,000 nanometers.

Illustrative laser dyes for use in the invention include for instance those selected from among the Formulas 1, 2 and 3 below.

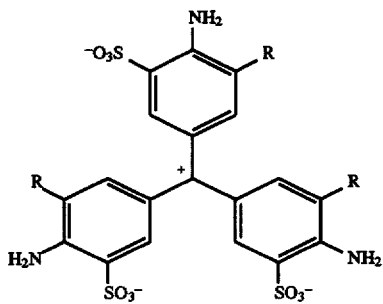

1:

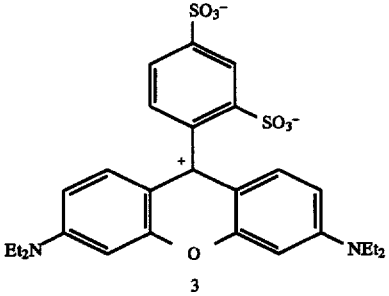

3

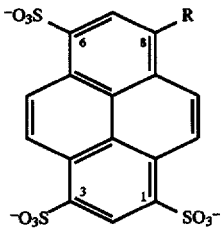

2a: R=OH         2f: R=NH$_2$
2b: R=O$^-$      2g: R=OCH$_2$C(O)OCH$_3$
2c: R=OCH$_3$    2h: R=CHO
2d: R=SO$_3^-$   2i: R=CO$_2$H
2e: R=Br         2j: R=C(O)CH$_3$ wherein the groups "R" in Formula 1 can be —H or lower alkyl (i.e. alkyl with one to four carbon atoms, and the group "Et" in Formula 3 is ethyl, but could also be any lower alkyl, and the group "R"0 in Formula 2 can be any of those groups shown above, or other like groups.

The 1,3,6-trisulfonated pyrene derivatives (e.g. Formula 2 above) have been found to be particularly well suited for use in the present invention, particularly in conjunction with potassium sulfate and isomorph salts thereof. It has been found that the substituent at the 8-position can be altered without significantly affecting the incorporation of the dye into the salt crystal. In this manner, the substituent at the 8-position can be used to tune the optical properties of the lasing crystals of the invention. Generally speaking, the group R at the 8-position of the trisulfonated pyrene motif can be, for example, lower alkyl (i.e. $C_1$ to $C_4$ alkyl), hydroxy, oxide (O$^-$), lower alkoxy such as methoxy, sulfate, halos such as bromo, amino, a carbonyl-containing group such as an aldehyde (e.g. CHO), carboxylic acid (e.g. CO$_2$H), or ketone (e.g., see (O) CH$_3$), or still other like groups which do not interfere with the ability of the laser dye to be incorporated into the crystal lattice.

The selection and use of an appropriate laser dye/crystal combination will be well within the purview of the ordinarily-skilled artisan given the teachings herein. Generally speaking, crystallographic sites are best selected that are exposed on low index faces commonly expressed by the host crystals. Salt morphologies and structures may be analyzed with a single crystal X-ray diffractometer. Moreover, dye geometries may be predicted with semi-imperical quantum mechanical programs, and appropriate trial chromophores designed accordingly. Such considerations will be well understood by the skilled artisan and will enable the same to select combinations which will suitably co-crystallize without any undue burden or experimentation.

Suitable lasing crystals of the invention are prepared by providing a solution containing the lasable dye and the salt, the solution being in water. The water is then allowed to evaporate, forming a crystal. In this process, the lasable dye and salt co-crystallize such that the lasable dye molecules are incorporated in the crystal lattice in single crystal register. Moreover, the lasable dye molecules co-crystallize to provide a lasing crystal having an effective amount of dye and which can be pumped to emit an effective beam of polarized light.

Once formed, the lasing crystal can be incorporated into a solid state laser dye system using other conventional components as known in the art. For example, a suitable pumping source can for example be another laser or a flashlamp. Pumping lasers are preferred, for example including Nd:YAG lasers, ruby lasers, or any other suitable laser for creating emission of the lasing crystal. The pumping laser will be selected to have an output near the peak of the dye absorption band. Further, both pulsed and continuous pumping lasers are contemplated as being within the scope of the present invention. Moreover, the lasing crystals in accordance with the invention can be pumped colinear with the long axis of the crystal, or by transverse geometry, as is will be recognized by those skilled in the art given the disclosures herein. For example, in particular with respect to non-linear potassium dihydrogen phosphate (KDP) crystals, these may be used for self-doubling when pumping directly by an infrafred source such as a diode laser, eliminating the need for a separate doubling crystal. By orienting the KDP crystal for phase matched second-harmonic generation of the input pump laser wavelenth, a pulsed diode laser can be used for direct optical pumping of the organic dye.

The solid state lasers of the invention are highly advantageous, produce linearly polarized light, demonstrate high photostability and are characterized by good optical homogeneity.

For the purposes of further illustrating the preferred embodiments in the invention and their advantages, the following specific examples are provided. It will be understood that these examples are illustrative and not limiting in nature.

EXAMPLE 1

Preparation of Laser Dyes

Dyes 2a, 2d and 3 were obtained from Eastman, and the following dyes were prepared as described previously: 2c (8); 2g (9). The syntheses of 2e, 2f, 2h, 2I and 2j were modeled after the sulfonation procedures described in (10). Thus, for 2f, a solution of finely powdered 1-aminopyrene (869 mg, 4 mmol) in 10 ml chlorosulfonic acid was stirred under argon atmosphere for 10 hours at room temperature. The solution was poured on 30 g of crushed ice and the crude product was collected by filtration, washed with 20 mL cold water and dried under argon to give 1.4 g of 8-amino-1,3, 6-pyrenetrisulfonylchloride (69%). Hydrolysis of this chloride in basic water (NaOH, pH 8) gave a solution of 2f (8-amino-1,3,6-pyrenetrisulfonate). Analogous procedures were used to prepare 2g-2j, except replacing the 1-aminopyrene with the appropriate substituted pyrene starting material.

EXAMPLE 2

Growth of Crystals

Potassium sulfate crystals having incorporated therein lasable dyes in single crystal register were prepared as follows. For crystals containing 2a, an acidic aqueous solution ($10^2$M sulfuric acid) containing potassium sulfate ($5\times10^{-2}$M) and 2a ($2\times10^{-5}$M) was prepared, and allowed to evaporate at room temperature. The resulting crystals were well-formed and contained the dye included in {010} and {110} sectors. For crystals containing 2b, a similar procedure was employed except the aqueous solution was basic ($10^{-2}$M potassium hydroxide). Crystals containing 2c–j were similarly prepared, from neutral aqueous solutions.

The photophysical characteristics of these crystals were analyzed with a Photon Technologies LS-100 fluorimeter. Excitation and emission slits were at 90°. Crystals were suspended in sample cuvetes with the {010} faces at about 45° to both the excitation and emission slits. A xenon arc lamp was used as the light source for steady state measurements. For lifetime studies, the light source was the 358 nm line from a $N_2$ arc lamp. Two single nomochrometer were used, one for excitation and the other for emission. The spectra were recorded by a fast PMT interfaced to an IBM compatible computer. The results are presented in Table 1.

TABLE 1

Photophysical characteristics of doped trisulfonated pyrene and rhodamine dyes

| | in aqueous solution | | | in $K_2SO_4$ crystal | | |
|---|---|---|---|---|---|---|
| dye | excitation (nm) | emission (nm) | τ (ns) | excitation (nm) | emisson (nm) | τ (ns) |
| 2a | 404 | 511, 443 | 5.0 | 400 | 516, 440 | 4.6 |
| 2b | 454 | 513 | 4.6 | 440 | 533 | 6.9 |
| 2c | 409 | 427 | 12.0 | 400 | 446 | 11.1 |
| 2d | 376 | 402 | 3.4 | 370 | 408 | 3.3 |
| 2e | 379 | 396 | | 378 | 410 | |
| 2f | 430 | 504 | 4.4 | 440 | 515 | 4.1 |
| 2h | 409 | 430 | 3.1 | 410 | 438 | 3.0 |
| 2i | 376 | 384 | 7.8 | 420 | 409 | 6.1 |
| 2j | 373 | 402 | 1.3 | 413 | 436 | 2.8 |
| 2k | 378 | 386 | 1.8 | 373 | 413 | 3.8 |
| 3 | 573 | 584 | 1.6 | 580 | 602 | |

In work with potassium dihydrogen phosphate crystals, inclusions of hematein were prepared as described in (11). It was observed that the inclusions of hematein are strongly dichroic; absorption is pronounced for light polarized along a or b but absent for light polarized along c. INDO/S calculations (12) indicate that the electric dipole moment for the visible transition at 440 nm runs along the vector connecting the ispo-phenyl carbons thus suggesting that molecules of hematein are oriented such that this vector is parallel to [110]. It was also observed that hematein, a naturally occurring compound with an absolute S configuration (13), stains only one pair of the four prismatic faces; it stains the {010} sectors, but not the {100} sectors. The a and b faces of KDP are related by diagonal glide planes in space group I-42d and are thus enantiomorphous. Therefore, it appears that hematein recognizes the KDP faces enantiospecifically (14). Nevertheless, the acid-base and redox chemistries of the polyhydroxybenzoquinone hematein are quite complex (15). It may well be that more than one chromophore resides in the KDP crystals. Studies were thus performed to find analogous recognition processes using redox stable dye guests with simpler pH dependencies.

A number of dyes were screened for their activity with respect to KDP crystals growing from aqueous solutions (0.5M KDP. $10^{-3}$–$10^{-4}$M dye) in insulated containers at room temperature. The resulting large 1 cm$^3$ crystals were inspected for visible regiospecific colorations. Of the types of dyes tested it was found that the sulfonated azo dyes Chicago Sky Blue 6B (Formula 4), Amaranth (Formula 5), Direct Blue 15 (Formula 6) (17), and Trypan Blue (Formula 7) (18) stained the eight pyramidal {101} faces. Typical dye/salt ratios in a colored sector ranged from 1 mole of dye for every $5\times10^3$–$5\times10^4$ moles of $KH_2PO_4$.

The solid state absorption spectra of dye inclusions noted immediately above were measured. In each case $\lambda_{max}$ was blue shifted for dyes in the crystal relative to neutral water solutions or saturated aqueous KDP solutions (Table 2). Several processes, even excepting interactions between the host and guest, may account for the blue shift. In basic solution (pH=12) ortho-hydroxy azo dyes show a blue shift on the order of 20 nm which is attributed to the conjugate base. This mechanism is not likely however because saturated solutions of KDP are acidic (pH~5). Dye dimerization in some geometries can produce blue shifts according to simple exciton theory (19). Alternatively, the persistent blue shift could result from the rotation of one aryl substituent with respect to another thereby reducing delocalization in the pi-system in the crystal structure compared with the solution ground state structure. Such a conformational

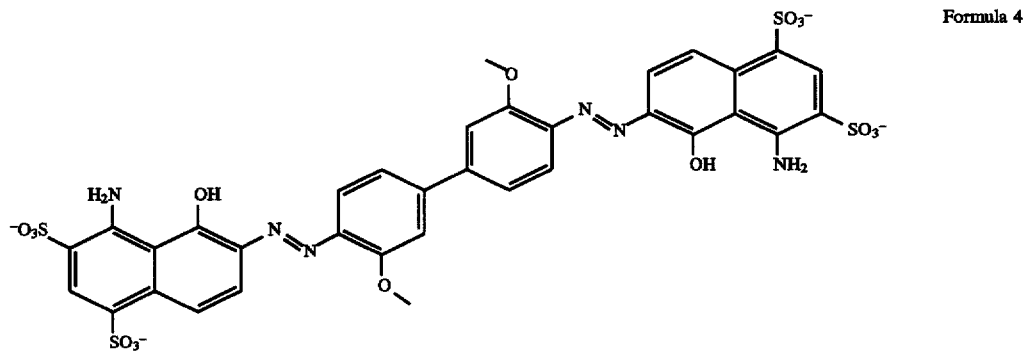

Formula 4

Formula 5

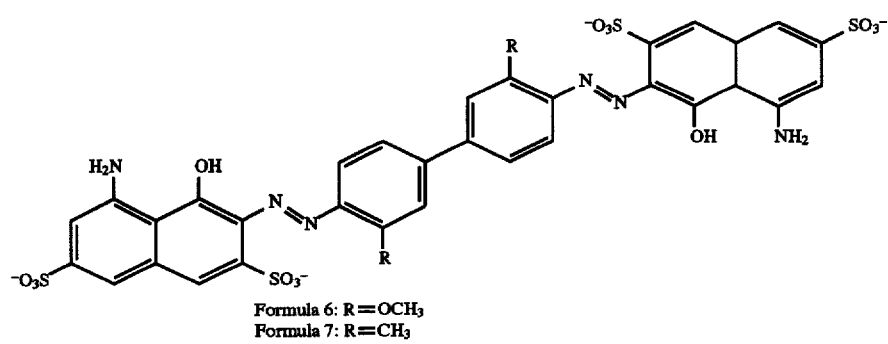

Formula 6: R=OCH$_3$
Formula 7: R=CH$_3$

Formula 8

Figure 2:
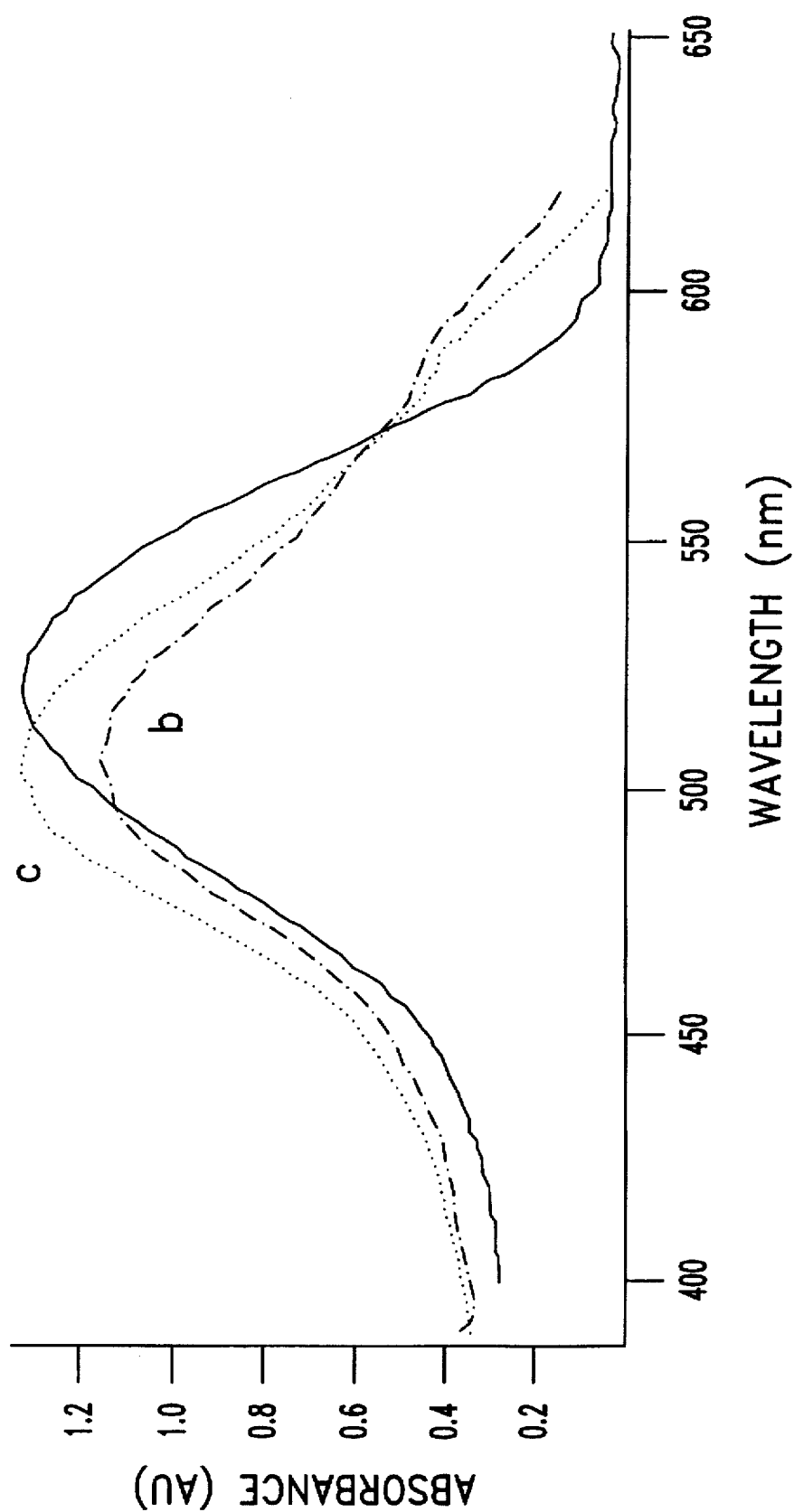
FIG. 2 provides polarized absorption spectra of oriented Amaranth/KDP crystals for light propagating along the {100} and polarized parallel to b and c axes. The fine line is the absorption spectrum of Amaranth in water, pH=7.

Formula 9 change might result from constraints imposed by the host. Inspection using linearly polarized light indicated that these inclusions are at best weakly dichroic. This was confirmed and quantified by measuring the polarized visible absorption spectra of cut, polished, and oriented single growth sectors with light incident in and polarized along the principal directions. The crystals were cut with a razor blade and polished on scintered glass plates or with polyurethane pads impregnated with alumina abrasives. The fragments were oriented by taking advantage of their vibration directions and well-shaped as-grown facets. FIG. 2 shows the polarized absorption spectra of oriented Amaranth/KDP crystals and the corresponding absorption spectra in water. The dyes exhibited surprising thermal and photochemical stability in the KDP crystals. The color was not bleached up to the melting point of the crystals (253° C.) nor under exposure for one hour to the output of a 500 W Hg arc lamp at room temperature.

TABLE 2

Absorption maxima for dyes 2–5 in aqueous solutions and in KDP crystals and corresponding emission maxima for dyes 6–7.

| Dye | CI No (20). | $\lambda_{max}$ $H_2O$ | $\lambda_{max}$ aq. KDP soln. | $\lambda_{max}$ KDP crystal |
|---|---|---|---|---|
| Chicago Sky Blue 6B | 24410 | 617 | 617 | 592 |
| Amaranth | 16185 | 520 | 519 | 506 |
| Direct Blue 15 | 24400 | 596 | 594 | 584 |
| Tryptan Blue | 23850 | 595 | 591 | 580 |
| Coumarin, Formula 8 | — | 394, 439 | 385, 444 | 396, 424 |
| Coumarin, Formula 9 | — | 448 | 448 | 422 |

The dyes of Formulas 4–7 do not have large quantum efficiencies for fluorescence and are not well suited to laser applications. Coumarin derivatives of Formulas 8 and 9 were thus synthesized, carrying phosphate groups. The dye of Formula 8 recognizes the {101} faces while the dye of Formula 9 recognizes the {100} faces. This result is in keeping with the fact that the number of free hydrogen bonding substituents in the phosphate groups of the Formula 8 and 9 molecules (three and two respectively) is the same as the number of simultaneous lattice H-bonds an incipient phosphate group makes upon adsorption. Emission maxima are listed in Table I. The molecule of Formula 8 has two distinct emission maxima in solution. The low energy emission of similar coumarins has previously been attributed to the exciplex emission from the protonated fluorophore (21). The luminescence from these dyes was not stable in solution nor in KDP crystals with respect to UV-irradiation (330 nm). It has been previously noted that molecules with ends of distinctly different hydrophilicities enter ionic crystals as dimers (22). Such an arrangement places the charge functionalities on the surface of the ionic crystals for the purpose of attachment and pointing away from the interface to encourage the nucleation and continued growth of the host crystal around an otherwise offensive impurity. The [2+2] photodimerization of coumarins is a well-studied reaction both in solution and in the solid state (23). It is expected that pairwise aggregation followed by photodimerization would lead to the observed decay in luminescence.

Given the disparate structures of the dyes in the work noted above, there may not necessarily be a single mechanism for dye incorporation in KDP. However, the following correlation between molecular structure and preference for the {100} or {101} faces has not been contradicted by experiment: the dyes of Formulas 4–8 that have tetrahedral anions in which one and only one ligand is connected to the chromophore select the {101} faces while only hematein and the dye of Formula 9 which do not have such functional groups select {100}. In keeping with this correlation, ten other sulfonated azo dyes show selectivity for {101} as mentioned above.

The distinct topological features of the {101} surfaces of KDP are the emergent phosphate oxygens that point nearly along the body diagonal of the unit cell [$v_{p-o}$:$\cos\lambda_a$=0.59, $\cos\lambda_b$=0.59, $\cos\lambda_c$=0.55]. Tetrahedral anion substitution for a phosphate on the {101} surface would direct the dye molecule away from the surface along $v_{p-o}$. The reciprocal recognition motif, and guest phosphonate substituents substituting for crystalline sulfates, have been illustrated by Davey and coworkers in their studies of $BaSO_4$ growth inhibition (24).

EXAMPLE 3

Lasers

Pulsed lasers were constructed using the 2b, 2c and 3 doped potassium sulfate crystals placed in a Fabry-Perot configuration. The harmonics of a Q-switched Nd:YAG laser were used as the pumping source (2b, 2c: third harmonic, 355 nm; 3, second harmonic, 532 nm). The excitation beam was typically at an oblique angle to the {010} faces. The green 2b laser emission was centered at 541 nm, with a 6 nm full width at half maximum, whereas the 2c laser output was blue, with maximum power at 441 nm. In each case the laser light was linearly polarized along the [001] direction. Without any surface preparation of the crystals, the scattering losses endured at the laser wavelengths were typically 40%. In the absence of any cooling mechanism, the laser exhibited 3 dB optical power degradation after approximately $10^3$ laser pulses (10 ns pulse duration, 500 μJ pump pulse energy). Similar dye lasers were prepared with potassium sulfate crystals doped with 3. The resulting emission covered the spectral range from 595 to 620 nm with the maximum efficiency at 600 nm.

REFERENCES

1. Soffer et al., *Appl. Phys. Lett.*, 10(10), 266 (1967).
2. Peterson et al., *Appl. Phys. Lett.*, 12(7), 238 (1968).
3. U.S. Pat. No. 5,136,005.
4. U.S. Pat. No. 4,016,133.
5. U.S. Pat. No. 4,878,224.
6. U.S. Pat. No. 5,329,540.
7. M. Maeda, *Laser Dyes*, Academic Press, New York (1984).
8. Kondo et al., *J. Phys. Chem.* 1982, 86, 4826–4831
9. Whitaker et al., *Anal. Biochem.* 1991, 198, 119–130.
10. Huntress et al., *J. Am. Chem. Soc.* 1940, 62, 511–514; Huntress et al., *J. Am chem. Soc.* 1940, 62, 603–604; Gilbert, E. E., *Sulfonation and Related Reactions*, Interscience Publishers, New York, 1965, p. 84; and Gilbert, E. E., *Synthesis*, 1969, 1, 3–10.
11. H. Blattner, B. Mattbias, W. Merz, *Helv. Phy. Acta.*, Vol. 19, p. 415 (1946).
12. J. Ridley, M. C. Zerner, *Theor. Chim. Acta*, Vol. 32, p. 111 (1973); Vol. 42, p. 223 (1976).
13. M. Namikosi, H. Nakata, H. Yamada, M. Nagai, T. Saitoh, *Chem. Pharm. Bull.*, Vol. 35, p. 2761 (1987).
14. Bonner has reviewed the literature on the recognition of enantiomers by chiral mineral crystals and the relation of enantioselective supramolecular adsorption to the origin of biomolecular handedness (W. A. Bonner, *Topics in Stereochemistry*, Vol. 19, pp 16–22 (1988)); See also: S. C. Bondy, M. E. Harrington, *Science*, Vol. 203, p. 1243 (1979); A. M. Cody, R. D. Cody, *J. Cryst. Growth*, Vol. 113, pp 508–519 (1991).

15. G. C. Lalor, S. L. Martin, *J. Soc. Dyers Colourists*, Vol. 75, pp 513, 517 (1959).

16. M. J. S. Deawr, E. G. Zoebisch, E. F. Healy, J. J. P. Stweart, *J. Am. Chem. Soc.*, Vol. 107, p. 3902 (1985).

17. Dye "Direct Pure Blue" had been shown to affect the rate of growth of KDP {101} surfaces (V. N. Portnov, L. N. Nikolaeva, *Uch. zap. gor'kov, un-t*, Vol. 167, pp 33–39 (1973).

18. Dyes 2,3,5 were purchased from Aldrich. Dye 4 was purchased from Sigma. Dye 1 was derived from the air oxidation of hematoxylin which was also supplied by Aldrich.

19. J. Kasha, H. R. Rawls, M. Ashraf El-Bayoumi, *Pure Appl. Chem.*, Vol. 11, pp 371–392 (1965).

20. *Colour Index*, 3rd. ed. Society of Dyers and Colourists, London (1982).

21. C. V. Shank, A. Dienes, A. M. Trozzolo, J. A. Meyer, *Appl. Phys. Lett.*, Vol. 16,m pp 405–407 (1970); A. Dienes, C. V. Shank, A. M. Trozzolo, *Appl. Phys. Lett.*, Vol. 17, pp 189–191 (1970).

22. L. Bastin, B. Kahr, unpublished results.

23. A. Ramamurthy, K. Venkatesan, *Chem. Rev.*, Vol. 87, pp 433–481 (1987); and references therein.

24. R. J. Davey, S. N. Black, L. A. Bromley, D. Cottier, J. E. Rout, *Nature*, Vol. 353, pp 549–550 (1991); A. L. Rohl, D. H. Gray, R. J. Davey, C. R. A. Catlow, *J. Am. Chem. Soc.*, Vol. 188, pp 642–648 (1996).

What is claimed is:

1. A dye laser, comprising:

a lasing crystal;

said lasing crystal being contained in a resonant cavity delimited by energy extracting means;

a pumping energy source operably coupled with the lasing crystal and operable to produce stimulated emission of the lasing crystal; and said lasing crystal comprising a crystalline lattice incorporating lasable dye molecules oriented in single crystal register in the crystalline lattice, whereby said stimulated emission is polarized.

2. The dye laser of claim 1, wherein:

the lasing crystal is formed from a rubidium or potassium salt.

3. The dye laser of claim 2, wherein:

the lasing crystal is formed from a rubidium sulfate, potassium sulfate or potassium dihydrogen phosphate salt.

4. The dye laser of claim 3, wherein:

the lasing crystal is formed from potassium sulfate or potassium dihydrogen phosphate.

5. The dye laser of claim 1, wherein:

the lasable dye molecules are di- or trisulfonated lasable dyes.

6. The dye laser of claim 5, wherein:

the lasable dye is a trisulfonated pyrene derivative.

7. The dye laser of claim 6, wherein:

the lasable dye is a 1,3,6-trisulfonated pyrene derivative.

8. The dye laser of claim 7, wherein:

the lasing crystal is formed from a rubidium or potassium salt.

9. The dye laser of claim 1, wherein:

the lasing crystal is formed from a phosphate salt, and the lasable dye contains hydrogen bond donors or anionic substituents.

10. The dye laser of claim 9, wherein:

the lasing crystal is formed from a dihydrogen phosphate salt.

11. The dye laser of claim 10, wherein:

the lasing crystal is formed from potassium dihydrogen phosphate.

12. A method of lasing, comprising: providing a lasing crystal;

pumping the lasing crystal with a pumping energy source to produce stimulated emission of the lasing crystal; and wherein the lasing crystal comprises a crystalline lattice incorporating lasable organic dye molecules oriented in single crystal register in the crystalline lattice, whereby said stimulated emission is polarized.

13. The method of claim 12, wherein:

the lasing crystal is formed from a rubidium or potassium salt.

14. The method of claim 13 wherein:

the salt is potassium sulfate or potassium dihydrogen phosphate.

15. The method of claim 12, wherein:

the lasable dye molecules are di- or trisulfonated lasable dyes.

16. The method of claim 14, wherein:

the lasable dye is a trisulfonated pyrene derivative and the salt is potassium sulfate.

17. The method of claim 15, wherein:

the lasable dye is a 1,3,6-trisulfonated pyrene derivative.

18. The method of claim 17, wherein the lasing crystal is formed from a rubidium sulfate or potassium sulfate salt.

19. The method of claim 18, wherein the lasing crystal is formed from potassium sulfate salt.

20. The method of claim 12, wherein the lasing crystal is formed from a dihydrogen phosphate salt.

21. The method of claim 20, wherein the lasing crystal is formed from potassium dihydrogen phosphate.

22. A crystal for non-linear optics, comprising:

a single crystal having a crystalline lattice;

incorporated in the crystalline lattice, a fluorescent dye which is a trisulfonated pyrene derivative; and wherein the fluorescent dye is incorporated in the crystalline lattice in single crystal register, whereby the crystal is pumpable by a pumping energy source to produce polarized stimulated emission.

23. The crystal of claim 22, wherein:

the crystal is formed from a potassium or rubidium salt.

24. The crystal of claim 23, wherein:

the crystal is formed from a potassium sulfate salt.

25. The crystal of claim 24, wherein:

the fluorescent dye is a 1,3,6-trisulfonated pyrene derivative.

* * * * *

UNITED STATES PATENT AND TRADEMARK OFFICE
CERTIFICATE OF CORRECTION

PATENT NO. : 5,701,323

DATED : December 23, 1997

INVENTOR(S) : Bart Kahr et al.

It is certified that error appears in the above-indentified patent and that said Letters Patent is hereby corrected as shown below:

In col. 4, line 45, please delete "0" in between ""R"" and "in".

In col. 6, line 13, please delete "$10^2$M" and insert in lieu thereof --$10^{-2}$M--.

In col. 10, line 59, the first line of Reference 11, please delete "Mattbias" and insert in lieu thereof --Matthias--.

Signed and Sealed this

Fifth Day of October, 1999

Attest:

Q. TODD DICKINSON

*Attesting Officer*  *Acting Commissioner of Patents and Trademarks*